United States Patent [19]

Seitz et al.

[11] Patent Number: 4,850,411

[45] Date of Patent: Jul. 25, 1989

[54] VEHICLE WHEEL

[75] Inventors: Hans Seitz, Langenhagen; Heinz-Dieter Rach, Garbsen; Henner Pieper; Udo Frerichs, both of Langenhagen, all of Fed. Rep. of Germany

[73] Assignee: Continental Aktiengesellschaft, Hanover, Fed. Rep. of Germany

[21] Appl. No.: 119,301

[22] Filed: Nov. 6, 1987

Related U.S. Application Data

[63] Continuation of Ser. No. 937,439, Dec. 3, 1986, abandoned, which is a continuation of Ser. No. 720,054, Apr. 5, 1985, abandoned, which is a continuation of Ser. No. 431,604, Sep. 30, 1982, abandoned.

[30] Foreign Application Priority Data

Nov. 14, 1981 [DE] Fed. Rep. of Germany ....... 3145252

[51] Int. Cl.$^4$ ............... B60B 21/02; B60C 15/02
[52] U.S. Cl. ................. 152/379.3; 152/380; 152/516; 152/DIG. 20; 301/95
[58] Field of Search ................... 301/95–98; 152/375, 379.3, 379.4, 379.5, 380, 382, 387, 388, 516, 520, 521

[56] References Cited

U.S. PATENT DOCUMENTS

| 1,885,484 | 11/1932 | Shoemaker | 152/10 |
| 1,932,191 | 10/1933 | Shoemaker | 152/397 |
| 2,844,180 | 7/1958 | Omeron | 152/381.4 |
| 4,169,496 | 10/1979 | Cataldo | 152/379.3 |
| 4,408,647 | 10/1983 | Kuhn et al. | 152/387 X |

FOREIGN PATENT DOCUMENTS

| 3000428 | 7/1981 | Fed. Rep. of Germany | 152/387 |
| 2078638 | 1/1982 | United Kingdom | 301/98 |

Primary Examiner—Russell D. Stormer
Attorney, Agent, or Firm—Becker & Becker

[57] ABSTRACT

A vehicle wheel for pneumatic tires. The rim of the wheel has radially inwardly extending rim flanges, and adjacent thereto, along the inner periphery, has seats inclined in cross section for a belted tire, and adjacent thereto, has recessed portions. The recessed portions adjoining the seats extend at least partially inclined in cross section. The angle of inclination of the recessed portions with respect to the axial direction is equal to or greater than the corresponding inclination angle of the seats. The recessed portions, in the axial direction, have a dimension which is equal to or greater than that of the axial segments of the seats.

10 Claims, 2 Drawing Sheets

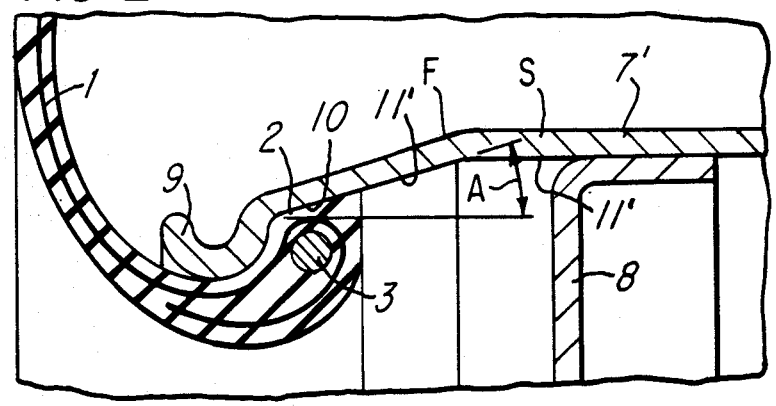
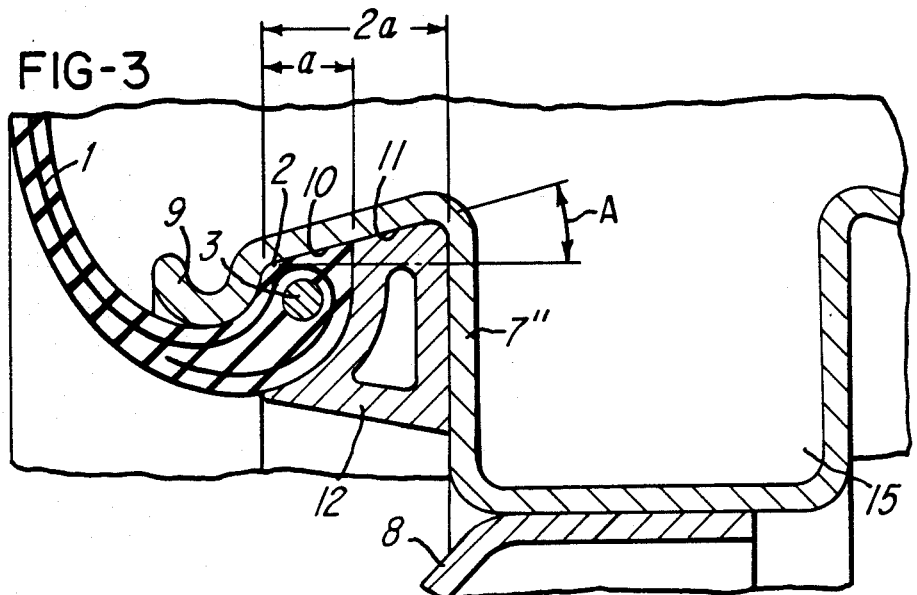
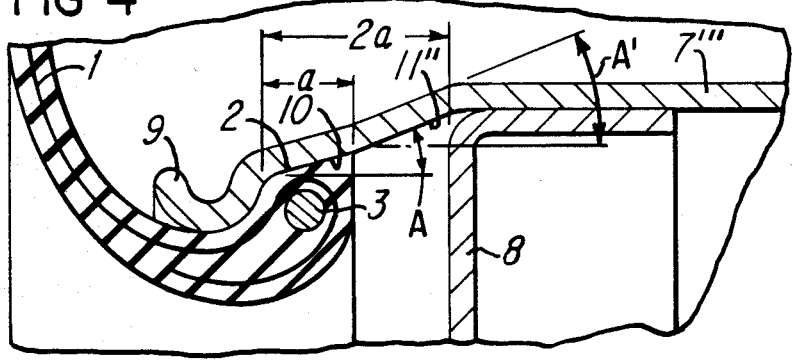

VEHICLE WHEEL

This application is a continuation of copending application Ser. No. 937,439-Seitz et al filed Dec. 3, 1986, now abandoned, which is a continuation of Ser. No. 720,054-Seitz et al filed Apr. 5, 1985, now abandoned, which is also a continuation of parent Ser. No. 431,604-Seitz et al filed Sep. 20, 1982, now abandoned.

The present invention relates to a vehicle wheel for pneumatic belted tires having pull-resistant cores in the beads. The wheel has a rigid rim having radially inwardly extending rim flanges, and next to these, along the inner periphery, seats inclined in cross section for the belted tire. Furthermore, recessed portions are arranged along the inner periphery of the rim toward the central plane of the rim body, the average diamter of which is greater than the average diameter of the seat; this rim body thus is a rigid rim having a seating surface and having a mounting high bed configuration including a bottom thereof higher than the rim seating surface for the tire beads.

The present invention deals with a wheel which is very suitable for emergency operation; in other words, even after breakdown the tire remains capable of operating to a limited extent without becoming permanently damaged. For this purpose, it is necessary that the tire can be supported during emergency operation on comparatively wide rim segments, and that a bulging of the sidewalls remains possible.

DESCRIPTION OF THE PRIOR ART

A known wheel of the aforementioned general type, which has mounted thereon a tire having a described features, is disclosed for instance in German Offenlegungsschrift No. 30 00 428.5. Even though this known wheel already has features which are responsive with respect to the construction and arrangement of the rim and tire, it has been found that this rim causes not inconsiderable difficulties during manufacture.

An object of the present invention is to provide a vehicle wheel which is suitable for emergency operation and which permits the utilization of a rim that is simple and straightforward to manufacture while retaining or even improving the previously attained emergency operating characteristics.

This object, and other objects and advantages of the present invention will appear more clearly from the following specification in connection with the accompanying drawings, in which:

FIG. 2 is a view showing a partial section through another embodiment of the inventive wheel with a wider rim;

FIG. 3 is a view that shows an embodiment of a wheel according to FIG. 1, though with a drop-center or wellbase on the outer side with an especially wide rim; and FIG. 4 is a view showing a partial section of a further inventive embodiment of a wheel with a rim, with the seat and the depression having different angles of inclination.

Figure 1:
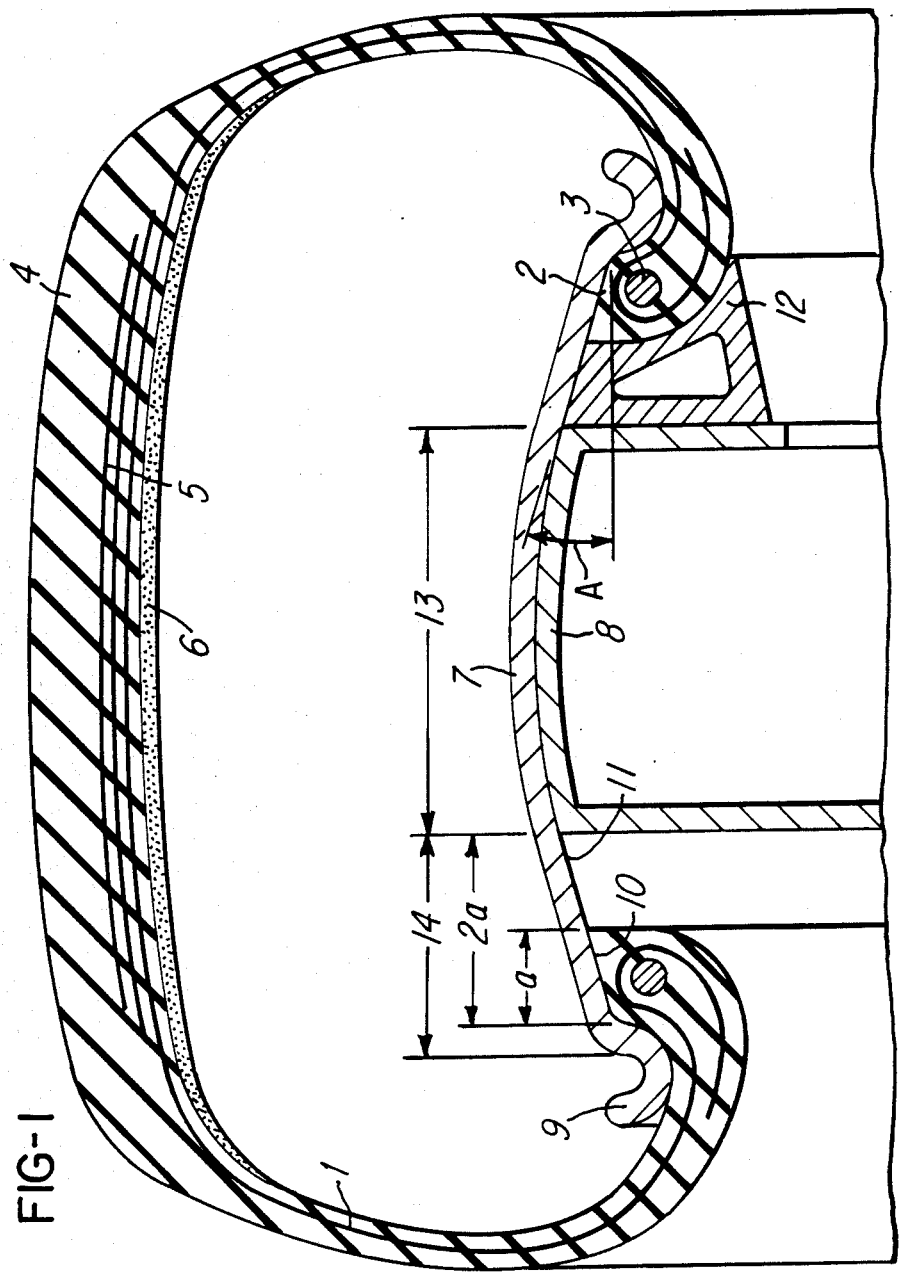
FIG. 1 is a view showing a radial partial section of one embodiment of the inventive wheel for a road vehicle.

The vehicle wheel of the present invention is characterized primarily in that the recessed portions, next to the seats, in cross section extend at least partially at an angle to the axial direction, in that the angle of inclination of the recessed portions with respect to the axial direction of the wheel is equal to or greater than the corresponding angle of inclination of the seats, and in that the recessed portions, in the axial direction, have a dimension which is equal to or greater than that of the axial segments of the seats.

The present invention offers the advantage that pursuant to the present disclosure, a rim can be used which at the transition between a seat and an adjoining recessed portion requires no special machining during manufacture. While the rim set forth with the known emergency-operation wheel has at this transition location a difficult-to-produce sharp bend, which becomes rounded off due to manufacturing reasons, with the wheel according to the present invention the inclination of the seats at the inner periphery of the rim preferably merges into the inclination of the adjoining recessed portion without any change of direction and without interruptionn in a seamless manner.

This is simultaneously accompanied by the advantage that on the outer circumference or periphery of the rim, the support surfaces can be considerably enlarged for supporting a flat or otherwise defective tire thereon. While with the known emergencyoperation wheel the parts of the rim of the wheel across from the recessed portions essentially serve as supporting surfaces, according to the present invention the parts of the rim opposite the seats are added, so that at least a doubling of the overall supporting surface results.

A further advantage consists in that, as a result of the path of course of the base of the recessed portions being inclined in the transverse direction, and as a result of the seamless transition from the adjoininng seats, a not inconsiderable saving of material is achieved during the manufacture of the rim.

According to advantageous embodiments of the present invention, the slope or inclination of the seats may merge at the same angle and without interruption into the inclination of the recessed portions, and the axial dimension of the recessed portions may equal that of the seats.

The inclination or slope of the seats may merge at the same angle and without interruption into the inclination of the recessed portions. The axial dimension of the seats may be essentially equal to that of the inclined part of the recessed portions, and the remaining part of the recessed portions may, in cross section, extend parallel to the axial direction of the wheel.

The recessed portions may also have a greater inclination angle than that of the seats, with the axial dimension of the inclined part of the recessed portions being essentially equal to the axial dimension of the seats.

The outer periphery of the rim body may be provided with a drop-center or wellbase.

The outer periphery of the rim body may, on the other hand, have a curvature which is convex in cross section.

The inclinationn or slope of each seat may extend at an angle of from 5° to 15° relative to the axial direction of the wheel, whereby the smallest diameter of the seat is located in the region of the adjoining rim flange.

A spacer ring may rest against the tire bead to essentially fill the space of the recessed portion.

Referring now to the drawings in detail, the pneumatic vehicle tire used with the wheel according to FIG. 1, and which is essentially made of rubber or rubber-like materials, has a radial carcas 1 which is anchored i nthe beads 2 by being looped around the pull-resistant bead core 3. Located below the tread 4 between the tread adn the carcass 1 is a belt 5 of two or more cord fabric plies, which belt 5 effects the side stabilization of the tire body, and is pull-resistant in the circumferential direction of the tire. The tire body, approximately in the region of the tread 4, additionally has a thin slide layer 6, on its inner surface which not only makes possible a supporting on the rim body, but which can also serve as a sealing layer in case of punctures.

The metal rim 7 of the wheel is welded to a pan 8 in a known manner. This rim 7 serves for mounting of the tire beads 2, and for supporting the tire in an emergency.

The rim 7, as seen in cross section, has on each axial or lateral outer side thereof a rim flange 9 which extends radially inwardly. A seat 10 for the tire extends substantially in the axial direction on the inner periphery of the rim 7 axially inwardly of, and adjacent to, each rim flange 9. The seat 10 extends straight in cross sectio in the transverse direction, and can be inclined at an angle A of from 5° to 15° to the axial direction, and in particular in such a manner that the smaller diameter is located next to the rim flange 9, while the largest inner diameter of the seat 10 is located exactly at the transition to the adjoining recessed portion 11. The axial dimension of the seat 10 is designated "a".

The inner wall of the rim 7 merges from the seat 10 into the adjoining recessed portion 11 in the direction toward the central plane without any interruption or steps and at the same angle of inclination relative to the axial direction; the inner wall of the rim 7 maintains this course over the entire width of the recessed portion 11. In the axial direction, the recessed portion 11 has essentially the same dimension "a" as does the seat 10. The recessed portion 11 serves to make it possible to mount the tire with its pull-resistant wire cores 3 even on one-piece rims. After the tire has been mounted, the recessed portion 11 can be filled by means of a spacer ring 12 in order to additionally secure the tire bead 2 against sliding off the rim.

On the radially outer side, between the parts located opposite or across from the recessed portions 11, i.e. in the middle region, the rim 7 has a section as a center part raised from bead seating location and as a middle supporting surface 13 which is convex in cross section, so that a very smooth transition is attained from the middle supporting surface 13 to the two supporting surfaces 14 located laterally thereof.

The rim 7' of the wheel according to FIG. 2 initially has the same course toward the middle in the axial direction from the outer side as does the rim of FIG. 1. The difference exists in a greater width of the recessed portion 11'. The first part F of othe recessed portion 11', with regard to the shape and dimensions, is identical with the overall recesed portion according to FIG. 1, while the second part S is cylindrical, so that the base of the recessed portion 11' extends axially parallel in cross section. The inner diameter of the rim 7', in the region of the second part of the recessed portion 11', is equal to the largest inner diameter of the first part. Rims constructed according to FIG. 2 are suitable for tires of greater width.

The wheel according to FIG. 3 differs from that according to FIG. 1 in that the rim 7", between the two recessed portions 11 (only one being shown in FIG. 3), has a drop-center or wellbase 15 arranged on the radially outer side; this wellbase 15 serves for better mounting with especially wide rims.

FIG. 4 illustrates an embodiment where the Angle A' of inclination or slope of the recessed portion 11" relative to the axial direction of the wheel has a greater angle of inclination than does the slope of the seat 10, so that the rim 7''' in cross section has a bend bettween the seat 10 and the recessed portion 11".

Further embodiments are also conceivable, and result from a combination of elements or features of the illustrated embodiments. Thus, in the embodiments of FIGS. 2 or 4, a radially outwardly located drop-center or wellbase 15 according to FIG. 3 can nalso be provided. In the embodiment of FIG. 2, where the recessed portion 11' has a cylindrical part, the inclined part of the recessed portion 11' could be shortened in the axial direction.

The present invention is, of course, in no way restricted to the specific disclosure of the specification and drawings, but also encompasses any modifications within the scope of the appended claims.

What we claim is:

1. A vehicle wheel for emergency operation with a pneumatic belted tire which has pull-resistant cores in its beads and a height/width ratio in a range of 65% to 40%, said wheel in combination comprising a rigid rim constructed for a tire of greater width than that of said rigid rim as well as having a seating surface and having a mounting high bed configuration including a bottom thereof radially beyond and higher than the rim seating surface for the tire beads, said rim being provided at its two axially outer edges with respective, radially inwardly extending rim flanges; the radially inner periphery of said rim, next to each rim flange and spaced axially inwardly thereof, being provided with radially inwardly located respective seats each having the seating surface for said beads of said belted tire; each seat, in cross section, being inclined to the axial direction of said wheel such that inclination of every seating surface to the axial direction of othe wheel extends at an angle in a range of 5° to 15° with the smallest diameter of said seat being located in the regionn of the adjacent rim flange; the radially inner periphery of said rim, next to each seat and toward the central radial plane of said wheel, also being provided with respective recessed portions, with the average diameter of recessed portions being greater than the average diameter of said seats; each recessed portion, in ncross section, beingn at least in part inclined to the axial direction of said wheel such that the seating surface merges continuously without an interruption into the adjacent recessed portion at a location inclined at the same angle as the bead seat so that an emergency operation support surface is provided via an inclined part of the recessed portion joined smoothly in the axial direction as obtained as part of the rim extending axially between the bead seating surfaces therewith, said emergency operation support surface extending radially beyond and laterally outwardly of said bead seating surface on opposite sides of said wheel respectively and, even after breakdown of the tire, said tire remains capable of operating to a limited extent without becoming permanently damaged due to said emergency operation support surface backing the tire after breakdown flattening thereof for expanded emergency operation support of the tire by said emergency operation support surface which includes a middle supporting surface portion as a continuous arcuate surface having a very smooth continuous transition to two integral supporting surface portions located directly laterally thereof entirely free of any transition step therebetween and extending laterally outwardly as well as radially beyond said bead seat; the angle of inclination of said recessed portions to the axial direction of said wheel being at least as great as the angle of inclination of said adjacent seats; the axial dimension of a given recessed portion being essentially equal to the axial dimension of the adjacent seat.

2. A wheel in combination according to claim 1, in which a given recessed portion has a first inclined part next to an adjacent seat, and a second inclined part located axially inwardly of said first inclined part and extending parallel to the axial direction of said wheel; in which a given seat extends at the same angle of inclination as does the adjacent first inclined part of the adjacent recessed portion, and merges therewith without an interruption; andn in which the axial dimension of a given seat is essentially the same as the axial dimension of the adjacent first inclined part of the adjacent recessed portion.

3. A wheel in combination according to claim 1, in which the radially outer periphery of said rim is provided with a drop-center.

4. A wheel in combination according to claim 1, in which the radially outer periphery of said rim is provided with a convex curvature.

5. A wheel in combination according to claim 1, which includes a spacer ring which essentially fills a given recessed portion and rests against the tire bead which is seated on the adjacent seat.

6. A vehicle wheel for emergency operation with a ppneumatic tire which has pull-resistant cores in its beads and a height/width ratio in a range of 65% to 40%, said wheel in combination comprising a rigid rim constructed for a belted tire of greater width than that of said rigid rim and with substantially inextensible cores in the beads, wherein the rim has radially and inwardly extending rim flanges as well as radially inwardly located seating surfaces for the beads of the belted tire, said seating surfaces having an inclined cross-section and being situated adjacent said flanges on the inner circumference thereof and having a mounting high bed configuration including a bottom thereof radially beyond and higher than the rim seating surface for the tire beads, and wherein also recesses are provided on the inner circumference of the rim and extend towards the central plane of the rim body, the average diameter of said recesses being greater than the average diameter of the bead seating surfaces, whereby the recesses extend with an inclined cross-section adjacent the bead seating surfaces, and the inclination of the bead seating surfaces passes without interruption into the inclination of the recesses, whereby the angle of inclination of the bead seating surfaces relative to the axial direction of the wheel is in a range of 5° to 15°, with the smallest diameter of the bead seating surface being located in the region of the adjacent rim flange and the inclination of the bead seating surfaces passes into the inclination of the recesses at the same angle, and in that the axial extension of the bead seating surfaces is identical to that of the inclined portions of the recesses such that the bead seating surfaces merge continuously without interruption into the adjacent recesses at a location inclined at the same angle as the bead seating surface so that an emergency operation support surface is provided via an inclined part of the recesses joined smoothly in the axial direction as obtained as part of the rim extending axially between the bead seating surfaces therewith, said emergency operation support surface extending radially beyond and laterally outwardly of said bead seating surface on opposite sides of said wheel respectively and, even after breakdown of the tire, said tire remains capable of operating to a limited extent without becoming permanently damaged due to said emergency operation support surface backing the tire after breakdown flattening thereof for expanded emergency operation support of the tire by said emergency operation support surface which includes a middle supporting surface portion as a continuous arcuate surface having a very smooth continuous transition to two integral supporting surface portions located directly laterally thereof entirely free of any transition step therebetween and extending laterally outwardly as well as radially beyond said bead seating surface; the angle of inclination of said recesses to the axial direction of said wheel being at least as great as the angle of inclination of said adjacent bead seating surfaces; the axial dimension of a given recesses being essentially equal to the axial dimension of the adjacentn bead seating surfaces.

7. A wheel according to claim 6, characterized in that, in addition to having the inclined portion, the recesses also have an additional portion which, in cross-section, extends parallel to the axial direction of the wheel.

8. A wheel according to claim 7, characterized in that the rim body has, on its outer circumference, a drop base.

9. A wheel according to claim 7, characterized in that the rim body has, on its outer circumference, a curved portion with a convex cross-section.

10. A wheel according to claim 7, characterized by a spacer ring which abuts against the tire bead and substantially fills the area of the recess.

* * * * *